No. 783,995.                                                       Patented February 28, 1905.

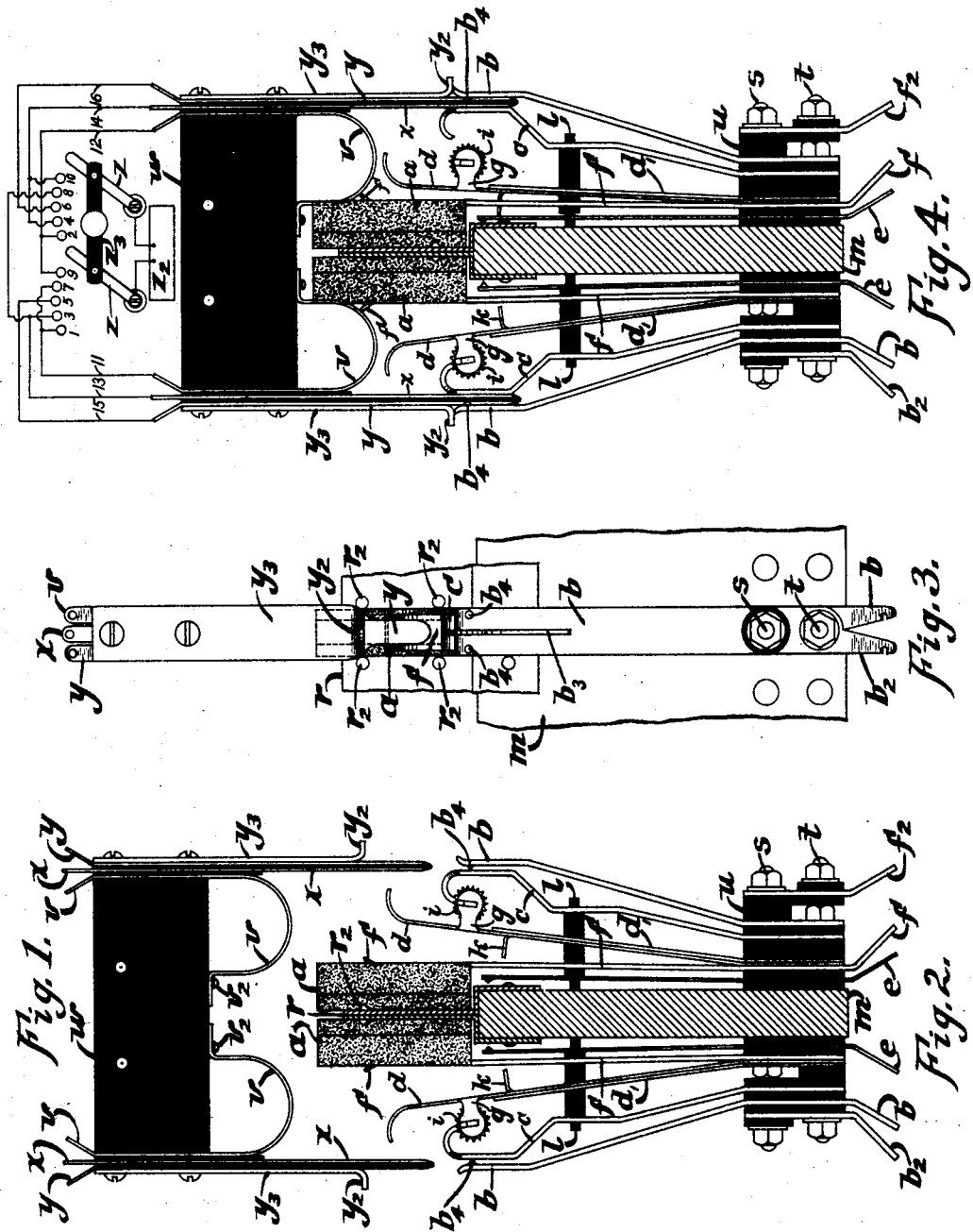

UNITED STATES PATENT OFFICE.

FRANK B. COOK, OF CHICAGO, ILLINOIS.

TEST-PLUG FOR PROTECTIVE APPARATUS.

SPECIFICATION forming part of Letters Patent No. 783,995, dated February 28, 1905.

Original application filed December 4, 1903, Serial No. 183,733. Divided and this application filed April 11, 1904. Serial No. 202,653.

*To all whom it may concern:*

Be it known that I, FRANK B. COOK, a citizen of the United States, residing at Chicago, in the county of Cook and State of Illinois, have invented new and useful Improvements in Test-Plugs for Protective Apparatus, of which the following is a full, clear, concise, and exact description, reference being had to the accompanying drawings, forming a part of this specification.

This application is a division of my application for patent on protective apparatus, Serial No. 183,733, filed December 4, 1903.

My invention relates to a test-plug to be used in connection with testing apparatus and electrical protective apparatus such as is used for protecting telephone-circuits from harmful electric currents, my object being to provide a convenient arrangement of such a test-plug and protective apparatus whereby the different circuits through the said apparatus may be readily and efficiently tested without removing any of the protective devices from their respective circuits.

The arrangement of protective apparatus as herein shown is for supporting and operating two classes of current-protective devices—namely, protective devices which protect electrical circuits and apparatus from high-tension electrical discharges, such as lightning, and protective devices which protect against small "sneak currents." The high-tension electric discharges are guarded against by means of lightning-arresters, preferably consisting of carbon blocks with interposed dielectrics and the sneak currents are guarded against by means of heat-coils or thermal arresters. This protective apparatus comprises spring-supports provided with suitable contacts and arranged for holding the lightning-arresters and heat-coils, the said spring-supports being suitably mounted on a plate, which is preferably a part of the iron supporting-frame and conductively connected to earth. When this apparatus is used in connection with telephone systems, the said springs are used as terminals for the line, switchboard, and alarm-circuits. When a thermal arrester operates, it throws a ground on certain springs of the combination, and thereby connects the objectionable current to earth.

The test-plug comprising this invention consists of a number of spring contact members, preferably arranged in pairs insulated from each other and adapted to coöperate with respective springs of the protective apparatus. These spring contact members are conductively connected with respective contacts of a switch which is adapted to connect the said members of the test-plug with a test instrument, and thereby allow different circuits through the protective apparatus to be tested when the test-plug is connected with the said protective apparatus. The spring contact members of the test-plug are suitably mounted on an insulating-block which gives a convenient arrangement for handling.

I will more particularly describe my invention by reference to the accompanying drawings, illustrating same, in which—

Figure 1 is a side view of the test-plug. Fig. 2 is a side view of the protective apparatus with which the test-plug coöperates. Fig. 3 is an edge view of the test-plug and protective apparatus shown in Figs. 1 and 2, and Fig. 4 is a view showing the test-plug conductively connected with the protective apparatus for testing and the test-circuits and testing apparatus.

Like characters refer to like parts in the several figures.

The metal plate $m$ is preferably a part of the iron framework supporting the strips of protective apparatus or a part of a distributing-board through which the telephone-lines pass on their way to a central-station switchboard, and it is preferably connected to earth. It may be a part of any apparatus on which protective devices are mounted. The protective devices and springs are mounted in pairs upon plate $m$ and are preferably arranged so that the two devices forming a pair are mounted one on either side of this plate $m$ and opposite to each other. As the two protective devices forming a pair are similar to each other, I will describe in detail one only of the pair.

The conductor-strip $r$ is secured to one edge of plate $m$ and is provided with small projections $r^2 r^2$ thereon between which projections the carbon lightning-arrester $a$ is placed. Springs $e$, $f$, $d$, $d'$, $c$, and $b$ are all mounted flatwise on one side of plate $m$ by two double-ended bolts $s$ and $t$. The bolts $s$ and $t$ pass through suitable holes in the plate $m$ and are insulated from $m$ by suitable insulating sleeves and washers $u$, preferably of hard rubber. Spring $e$ is mounted next to plate $m$, but insulated therefrom, and is provided with a contact at its free end adapted to make contact with the ground-strip $r$ when the spring is depressed and with a hole therein through which an insulating-pin $l$ passes and rests against the plate $m$. This spring is used for closing an alarm-circuit. Spring $f$ is mounted next to spring $e$, but insulated therefrom, and extends past the forward edge of plate $m$, so as to form a support for the lightning-arrester $a$. Spring $f$ is made narrow at its free end, so as to fit in a groove in one of the carbon blocks of the lightning-arrester $a$, which is inserted between spring $f$ and ground-strip $r$ and held in place by the tension in spring $f$ and the projections $r^2 r^2$ on strip $r$. Spring $f$ is also provided with a hole therein through which a contact-point $k$ passes when the heat-coil operates and with another hole therein through which the insulating-pin $l$ passes. The insulating-pin $l$ is provided with a shoulder near its inner end adapted to hold spring $e$ out of contact with spring $f$. Spring $d$ is mounted next to spring $f$, so as to make electrical contact therewith, and is provided with ears $g$ near its free end adapted to firmly hold a heat-coil therebetween. Spring $d$ is also provided with a contact-point $k$, adapted to pass through a hole in spring $f$ and make contact with spring $e$ when the heat-coil operates and with a hole therein through which the insulating-pin $l$ freely passes. Spring $d'$ is mounted against spring $d$, serving to stiffen the latter, and is provided with a hole therein through which the insulating-pin $l$ freely passes. Spring $c$ is mounted next to spring $d'$, but insulated therefrom, is provided with a curved portion at its free end adapted to engage a toothed member $i$ of the heat-coil and with a hole therein through which the insulating-pin $l$ passes, the tension in spring $c$ being against a shoulder near the outer end of pin $l$, which supports spring $c$ in a rigid position. Spring $b$ is mounted next to spring $c$, but insulated therefrom at its fixed end, and is provided with contact-points $b^4 b^4$ at its free end, which rest against spring $c$ and make contact therewith and which serve to prevent lateral displacement of a test-plug inserted therebetween. Spring $b$ is split at $b^3$, so as to allow contact-points $b^4 b^4$ to make contact with spring $c$ independently of each other. Springs $b$ and $c$ are turned over at their free ends to enable the springs of the test-plug to be readily inserted between them.

In Fig. 2 I preferably show the heat-coils in a "set" position, as they are intended to be in this position when the test-plug is used for testing the circuits through the protective apparatus. The principal circuits may be tested, however, when the heat-coils are in an "operated" position, as shown upon the right of Fig. 4.

On the right-hand side of Figs. 2 and 4 spring $b$ is conductively secured to bolt $t$ by a nut, but insulated from bolt $s$. Terminal $b^2$ is mounted on bolts $s$ and $t$, being insulated from bolt $s$ and conductively secured to bolt $t$. On the left-hand side of Figs. 2 and 4 springs $f$, $d$, and $d'$ are conductively secured to bolt $s$ by a nut, but insulated from bolt $t$. Terminal $f^2$ is also mounted on bolts $s$ and $t$, being insulated from bolt $t$ and conductively secured to bolt $s$. It will be readily seen that terminal $b^2$ is conductively connected to spring $b$ on the opposite side of plate $m$ from $b^2$ through the agency of bolt $t$ and that terminal $f^2$ is conductively connected to springs $d'$ $d$, and $f$ on the opposite side of plate $m$ from $f^2$ through the agency of bolt $s$. This arrangement puts the line-terminals $f$ and $f^2$ on one side of the plate $m$ and the switchboard-terminals $b^2$ and $b$ on the other side of plate $m$.

The test-plug consists of an insulating-block $w$, preferably of hard rubber, on each end of which is mounted a series of springs, the said springs being insulated from each other and arranged so that the springs $v$, $x$, and $y$ on one end of the block $w$ form pairs with respective corresponding springs $v$, $x$, and $y$ on the other end of block $w$. Springs $v$ $v$ are curved and loosely held to block $w$ at their respective free ends by pins $v^3 v^3$, respectively, so as to allow springs $v$ $v$ to give when the test-plug is connected with the protector-springs. Metal strips $y^3 y^3$ are mounted adjacent to springs $y$ $y$, respectively, and are provided with turned ends $y^2 y^2$, respectively, which act as stops for the test-plug when it is connected with the springs of the protective apparatus.

When the test-plug is connected with the protector-springs for testing, as shown in Fig. 4, springs $y$ $y$ engage springs $b$ $b$, respectively, springs $x$ $x$ engage springs $c$ $c$, respectively, and springs $v$ $v$ engage the carbon blocks $a$ $a$, respectively. On either side of plate $m$ springs $x$ and $y$ of the test-plug are forced between springs $c$ and $b$ of the protective apparatus, thus forcing springs $c$ and $b$ apart and breaking the electrical connection between them. Projections $y^2 y^2$ rest against springs $b$ $b$, respectively, and springs $v$ $v$ rest against the ends of springs $f$ $f$, respectively, all forming stops for the test-plug. Springs $y$ $y$ are connected to conductors 15 and 16, respectively, springs $x$ $x$ are connected to conductors 13 and 14, respectively, and springs $v$ $v$ are connected to conductors 11 and 12, respectively. Conductor 15 is connected to switch-contact 5, conductor 13 to contact 3 and 8, conductor 11 to contacts 1 and 7, conductor 12 to contacts 9 and 2, conductor 14 to contacts 4 and 10, and conductor 16 to contact 6. The switch $z$ is adapted to connect the test instrument $z^2$ in circuit with contacts 1 and 2, 3 and 4, 5 and 6, 7 and 8, or 9 and 10, as desired. This affords a simple means for testing the switchboard, the line through the heat-coils, the line direct, or either heat-coil, separately.

The circuits to be tested are as follows: first, from contacts 1 and 2, through conductors 11 and 12, springs $v v$, carbon blocks $a a$, springs $f f$, bolt $s$, terminal $f^2$, and the telephone-line which is connected to terminals $f$ and $f^2$; second, from contacts 3 and 4, through conductors 13 and 14, springs $x x$, springs $c c$, toothed members $i i$ and their respective heat-coils, springs $d d$, springs $f f$, bolt $s$, terminal $f^2$, and the telephone-line which is connected to terminals $f$ and $f^2$; third, from contacts 5 and 6, through conductors 15 and 16, springs $y y$, springs $b b$, bolt $t$, terminal $b^2$, and the switchboard-circuit which is connected to terminals $b^2$ and $b$; fourth, from contact 7, through conductor 11, spring $v$, (on the left of Fig. 4,) carbon block $a$, spring $f$, spring $d$, ears $g$ and the heat-coil contained therebetween, toothed member $i$, spring $c$, spring $x$, and conductor 13 to contact 8; fifth, from contact 9, through conductor 12, spring $v$, (on the right of Fig. 4,) carbon block $a$, spring $f$, spring $d$, ears $g$ and the heat-coil contained therebetween, toothed member $i$, spring $c$, spring $x$, and conductor 14 to contact 10. While I have traced out metallic circuits for the line and switchboard testing, it is evident that grounded return or common return circuits may be equally tested. In testing between contacts 7 and 8 or between contacts 9 and 10 the heat-coils and their contacts with their connecting-springs are tested as in actual service.

While I have described particular details of construction in this invention, I do not wish to limit myself to such exact details. The form of protective apparatus and heat-coils as herein shown may be greatly varied. What I desire to hereinafter claim is the combination of a test-plug with protective apparatus and testing apparatus to accomplish the desired results and general methods embodied in the above description.

Having thus described my invention, what I claim as new, and desire to secure by Letters Patent, is—

1. In apparatus of the class specified, the combination of a thermal protector, a normally closed switch associated with the protector and electrically connected therewith, a test-plug provided with contact members insulated from each other and adapted to coöperate with the said switch to open same and make connection for testing the apparatus, the said plug also being adapted to be connected with a testing instrument, substantially as described.

2. The combination with a thermal protector comprising means for controlling a circuit under abnormal current conditions, and a spring-switch electrically connected therewith; of a test-plug adapted to be connected with said switch to test a circuit, and also with a suitable testing instrument.

3. The combination of a test-plug for protective apparatus, comprising a pair of contact members insulated from each other, and suitably mounted, and a pair of protectors suitably mounted, the said contact members coöperating with like parts of the pair of protectors for the purpose of testing.

4. The combination with a pair of thermal protectors and pairs of normally closed switch-contacts in circuit with the respective protectors, of a test-plug having pairs of contacts insulated from each other, the pairs of contacts of the test-plug being adapted to be inserted between the respective pairs of normally closed switch-contacts of the protectors, and thereby open the said normally closed switch-contacts, the said plug being adapted to be connected with a testing instrument, and means for preventing lateral displacement of the test-plug.

5. The combination with a thermal protector and a pair of flat metallic switch-contacts conductively connected therewith, one of the said pair of contacts being in the nature of a spring adapted to normally bear against the other, of a test-plug provided with a pair of flat contacts separated by interposed insulation and adapted to be inserted between the said normally closed contacts of the protector, the said plug being adapted to be connected with a testing instrument, and means at each side of the said switch-contacts of the protector to maintain the plug in place between the said contacts.

6. The combination with a pair of thermal protectors and pairs of flat metallic switch-contacts conductively connected with the respective protectors, one of the said switch-contacts of each pair being in the nature of a spring adapted to normally bear against the other switch-contacts, respectively, of a test-plug provided with pairs of flat contacts, each pair being separated by interposed insulation and adapted to be inserted between the said normally closed contacts of either protector, the said plug being adapted to be connected with a testing instrument, and means at each side of the said switch-contacts of the protectors to maintain the test-plug in place between the said pairs of switch-contacts.

7. The combination with a thermal protector comprising means for controlling a circuit and operable upon the passage of an abnormally large current therethrough, and a switch-socket electrically connected therewith, of a test-plug adapted to be inserted in said socket to test a circuit, the said plug being adapted to be connected with a suitable testing instrument, and means included by the switch-socket for preventing lateral displacement of the plug.

8. The combination with thermal protectors comprising means for controlling respective circuits and operable upon the passage of abnormally large currents through the protectors, and a switch-socket for each protector and electrically connected therewith, of a test-plug adapted to be inserted in the said sockets to test a circuit, the said plug being adapted to be connected with a suitable testing instrument, and means included by the switch-sockets for preventing lateral displacement of the plug.

9. The combination of a test-plug for protective apparatus, comprising a pair of spring-connectors insulated from each other and suitably mounted, and a pair of similar protectors suitably mounted, the spring-connectors cooperating with like parts of the pair of protectors, for the purpose of testing.

10. The combination of a test-plug for protective apparatus, comprising pairs of spring-connectors suitably mounted and insulated from each other, and protective apparatus comprising a duplicate set of protectors, the pairs of spring-connectors of the test-plug cooperating with respective pairs of like parts of the protective apparatus, for the purpose of testing, substantially as described.

11. The combination of a test-plug for protective apparatus, comprising pairs of switch-contacts insulated from each other, the contacts of each pair being mounted upon opposite ends of a block of insulation, protective apparatus comprising a duplicate set of protectors, a switch, and a test instrument adapted to be thrown in circuit with certain switch-contacts of the test-plug which are adapted to cooperate with respective springs of the duplicate protective apparatus, for the purpose of testing different circuits through the protective apparatus, substantially as described.

12. The combination with protective apparatus comprising duplicate sets of springs mounted on opposite sides of a ground-plate, of a test-plug for such apparatus, comprising pairs of connecting-springs adapted to cooperate with the duplicate sets of springs of the protective apparatus, the said springs of the test-plug being insulated from each other, and the springs of each pair being mounted upon opposite faces of a block of insulation, a test instrument, and a switch adapted to connect the test instrument in circuit with certain springs of the test-plug, for the purpose of testing different circuits through the protective apparatus, substantially as described.

13. The combination of a test-plug for protective apparatus, provided with switch-contacts adapted to cooperate with said apparatus, a ground-plate, springs for each side of the ground-plate and mounted flatwise thereon, said springs being adapted to cooperate with said test-plug switch-contacts; and being line-terminals, switchboard-terminals and protective-device terminals, and a switch and test instrument adapted to cooperate with the test-plug, whereby, when the switch-contacts of the test-plug are engaged with the springs of the protective apparatus, the line-circuits, switchboard-circuits and protective-device circuits may be tested independently of each other, substantially as described.

14. The combination in a test-plug to be used in connection with protective apparatus, of a block of insulation, pairs of springs, the springs of each pair being mounted on opposite ends of the said block, each spring being insulated from all of the other springs, the springs of one pair being provided with respective stops to limit the insertion of the test-plug into the protective apparatus, and means for connecting the pairs of springs in respective test-circuits, substantially as described.

15. In a test-plug and socket-switch arrangement for testing protective apparatus, the combination of a ground-plate, a ground-strip secured to one edge thereof, a pair of superposed springs on each side of the ground-plate mounted flatwise thereon and insulated therefrom and from each other, one spring of each pair being held stationary by a suitable support, the other spring of each pair being movable, a protective device for each pair of springs and held therebetween, a third spring for each pair, mounted flatwise on the ground-plate between the latter and the respective inner springs of the said pairs, the said third springs being conductively secured to the respective inner springs of the said pairs, lightning-arresters inserted between the respective third springs and the ground-strip, a fourth spring for each pair, mounted flatwise on the ground-plate, outside of the respective outer springs of the said pairs, the said fourth springs being insulated from the ground-plate and from the other springs, at their fixed ends, and making contact with the respective outer springs of the said pairs at their free ends, the said test-plug being provided with individual springs adapted to engage the respective said fourth springs, the respective outer springs of the said pairs, and the respective said third springs and lightning-arresters, the said fourth springs being switchboard-terminals, the said third springs being line-terminals, and the said outer springs of the pairs being dead at their mounting, a projection on each outer spring of the test-plug, adapted to limit the insertion of the test-plug into the protective apparatus, a switch provided with contacts to which the respective springs of the test-plug are connected, and a test instrument connected in circuit with the said switch, all cooperating, whereby, when the springs of the test-plug are engaged with the springs of the protective apparatus, the switchboard-circuits may be tested independently of the line-circuits, the line-circuits may be tested direct, independently of the switchboard-circuits, the line-circuits may be tested through the said protective devices, independently of the switchboard-circuits, and the protective devices themselves, together with the contacts of their connecting-springs, may be tested separately, independently of the switchboard-circuits or line-circuits, substantially as described.

16. The combination in a testing arrangement for protective apparatus, of a thermal protector comprising normally closed switch-contacts, a heat-concentrating member and means operated thereby for opening the circuit, the said switch-contacts and heat-concentrating member being adapted to be connected in series in a circuit; and a test-plug having contacts adapted to be inserted between the said normally closed switch-contacts, said plug being adapted to be connected with a testing instrument; the protector having means at each side of the said switch-contacts to maintain the plug in place.

17. The combination in a testing arrangement for protective apparatus, of a thermal protector comprising a pair of flat metallic switch-contacts whereof one is in the nature of a spring adapted to normally bear against the other, a heat-concentrating member and means operated thereby for opening a circuit, said heat-concentrating member and metallic contacts being in series; and a plug provided with a pair of flat contacts separated by interposed insulation, said plug-contacts being adapted to be thrust between said normally closed metallic contacts of the thermal protector, and said plug being adapted to be connected with a testing instrument; the protector having means at each side of the said switch-contacts to maintain the plug in place between the contacts.

18. The combination with a thermal protector comprising means for opening a circuit and operable upon the passage of an abnormally large current through the device and a socket-switch electrically connected therewith; of a test-plug adapted to be inserted in said socket to test a circuit, the said plug being adapted to be connected with a suitable testing instrument, and means included by the socket-switch for preventing lateral displacement of the plug.

19. The combination in a test-plug to be used in connection with electrical protective apparatus, of a piece of insulation pairs of contact members, the members of each pair being mounted on opposite faces of the said insulation, each contact member being insulated from the others, suitable stops to limit the insertion of the test-plug into the protective apparatus, and means for connecting the pairs of contact members in respective test-circuits, substantially as described.

20. Apparatus comprising a pair of thermal protectors for electrical circuits, normally closed socket-switches electrically connected with the respective protectors, and a testing-plug adapted to be inserted in both of the socket-switches at the same time, for testing purposes.

21. In electrical protective apparatus, the combination with a ground-plate, of double-ended bolts passing therethrough and insulated therefrom and from each other, a pair of superposed springs mounted flatwise on the said plate by the said bolts but insulated from the said plate and from each other, a protective device adapted to be held in a state of stress by the said springs, a third spring outside of the pair of springs, mounted flatwise on the said plate by the said bolts, and insulated from the other said springs at its mounting, and contact-points near the free end of the said third spring and adapted to bear against the outer spring of the pair to form a normally closed socket-switch adapted to receive a test-plug, the said contacts preventing lateral displacement of the test-plug, one of the said bolts conductively connecting one spring of the pair with a connection-terminal on the opposite side of the ground-plate, substantially as described.

22. In electrical protective apparatus, the combination with a ground-plate, of double-ended bolts passing therethrough and insulated threfrom and from each other, a pair of superposed springs mounted flatwise on the said plate by the said bolts but insulated from the said plate and from each other, a protective device adapted to be held in a state of stress by the said springs and conductively connected from one to the other, a third spring outside of the pair of springs, mounted flatwise on the said plate by the said bolts and insulated from the other said springs at its mounting, and contact-points near the free end of the said third spring and adapted to form a normally closed socket-switch adapted to receive a test-plug, the said contacts preventing lateral displacement of the test-plug, one of the said bolts conductively connecting the said third spring with a connection-terminal on the opposite side of the ground-plate, substantially as described.

23. In electrical protective apparatus, the combination with a ground-plate, of double-ended bolts passing therethrough and insulated therefrom and from each other, a pair of superposed springs for each side of the ground-plate and mounted flatwise thereon by the said bolts but insulated from the said plate and from each other, a protective device for each pair of springs and adapted to be held in a state of stress therebetween, a third spring for each pair mounted flatwise on the said plate by the said bolts, outside of the respective said pairs, and insulated from the other said springs at their mounting, and contact-points near the respective free ends of the said third springs and adapted to form normally closed socket-switches with the respective outer springs of the pairs, the said socket-switches being adapted to receive a test-plug, the said contact-points preventing lateral displacement of the test-plug, one of the said bolts conductively connecting the inner spring of one pair with a connection-terminal on the opposite side of the ground-plate, the other said bolt conductively connecting one said third spring with a connection-terminal on the opposite side of the ground-plate, substantially as described.

24. In protective apparatus for electric circuits, the combination of a ground-plate, a pair of superposed springs mounted on one side thereof but insulated therefrom and from each other, a thermal protector held in a state of stress between the said springs, a third spring mounted on the said plate and adapted to form a normally closed socket-switch with one spring of the pair, the said socket-switch being adapted to receive a test-plug, and means for connecting the said third spring, the socket-switch, the thermal protector, and one spring of the pair, in a series circuit.

25. In an electrical protector, a socket-switch having normally closed contacts adapted to receive a connecting-plug and to prevent lateral displacement thereof, an excess-current-operable device connected in circuit with the said switch, and means for engaging the said device and tending to operate same.

26. An electrical protector comprising a pair of flat springs forming a normally closed socket-switch adapted to receive a connecting-plug, metallic contacts included by the socket-switch and adapted to prevent lateral displacement of the plug, a thermal cut-out connected in circuit with the socket-switch, and spring means for engaging the cut-out and tending to turn same upon its support.

27. In apparatus of the class specified, a plurality of normally closed socket-switches provided with means for receiving a connecting-plug of a testing instrument, metallic contacts in the switches for preventing lateral displacement of said plug, and electrical protectors adapted to be connected in circuit with the respective switches.

28. In protective apparatus for electric circuits, the combination of a ground-plate, a pair of superposed springs for each side of the ground-plate and mounted thereon, but insulated therefrom and from each other, a thermal protector for each pair and held in a state of stress between the springs of the pair, a third spring for each pair mounted on the said plate and adapted to form normally closed socket-switches with respective springs of the pairs, the said socket-switches being adapted to receive a test-plug, and means for connecting the said third springs, the socket-switches, the thermal protectors, and one spring of each pair, in a series circuit.

29. In an electrical protector, socket-switches provided with means for receiving a connecting-plug, metallic contacts in each of the socket-switches for preventing lateral displacement of the plug, excess-current-operable devices connected in circuit with the socket-switches, and means for engaging the said devices to operate same.

30. An electrical protector comprising pairs of flat springs forming normally closed socket-switches adapted to receive a connecting-plug, metallic contacts included by the socket-switches and adapted to prevent lateral displacement of the plug, thermal cut-outs connected in circuit with the socket-switches, and spring means for engaging the cut-outs and tending to turn same upon their supports.

31. In an electrical protector, a socket-switch provided with means for receiving a connecting-plug, means for preventing lateral displacement of the plug, a separable conductor associated with said socket-switch and connected in circuit therewith, a heat-producing means adapted to cause the separable conductor to operate, and a spring normally under tension and engaging said separable conductor.

32. In a device for protecting electrical circuits against abnormally large currents, a thermal cut-out, a socket-switch provided with means for receiving a connecting-plug and connected in series with the cut-out, means in the switch for preventing lateral displacement of the plug, and means for operating the cut-out to control a circuit.

33. In a device for protecting electrical circuits against excessive current, a heat-concentrating member, a spring socket-switch connected in series therewith, means in the switch for preventing lateral displacement of a testing-plug, and means for automatically opening the circuit through the heat-concentrating member under abnormal current conditions.

34. In electrical protective apparatus, socket-switches provided with means for receiving a testing-plug and for preventing lateral displacement of the plug, a separable conductor for each socket-switch and conductively connected therewith, and a spring member for each separable conductor, normally under tension and engaging the latter to operate same.

35. In apparatus of the class specified, socket-switch and lightning-arresters provided with means for receiving a test-plug and for preventing lateral displacement thereof, thermal protectors associated with the socket-switches, and suitable mounting and contact-springs for the thermal protectors and lightning-arresters.

36. In apparatus for protecting electrical circuits against abnormally large currents, thermal protectors, socket-switches connected in circuit with the thermal protectors and provided with means for receiving a testing-plug and for preventing lateral displacement of the plug, a suitable support to which the whole is mounted, and means for controlling a circuit when a thermal protector operates.

37. In apparatus for protecting electrical circuits against excessive current, excess-current-operable devices, spring socket-switches connected in series therewith and provided with means for preventing lateral displacement of a connecting-plug, and means whereby the operation of an excess-current-operable device controls a circuit.

In witness thereof I hereunto subscribe my name this 24th day of March, A. D. 1904.

FRANK B. COOK.

Witnesses:
    JNO. F. TOMPKINS,
    FREDERICK R. PARKER.